United States Patent
Knight et al.

(10) Patent No.: US 10,394,924 B2
(45) Date of Patent: Aug. 27, 2019

(54) SYNCHRONIZED WEB BROWSING HISTORIES: PROCESSING DELETIONS AND LIMITING COMMUNICATIONS TO SERVER

(71) Applicant: Apple Inc., Cupertino, CA (US)

(72) Inventors: Paul R. Knight, San Francisco, CA (US); Mark A. Rowe, Lakeport, CA (US); Richard J. Mondello, San Jose, CA (US); Jessie L. Berlin, Santa Clara, CA (US); Gavin Barraclough, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 263 days.

(21) Appl. No.: 14/500,174

(22) Filed: Sep. 29, 2014

(65) Prior Publication Data

US 2015/0347614 A1    Dec. 3, 2015

Related U.S. Application Data

(60) Provisional application No. 62/006,235, filed on Jun. 1, 2014.

(51) Int. Cl.
*G06F 16/957* (2019.01)
*G06F 16/23* (2019.01)

(52) U.S. Cl.
CPC ........ *G06F 16/957* (2019.01); *G06F 16/2365* (2019.01)

(58) Field of Classification Search
USPC ........................................................ 707/692
See application file for complete search history.

(56) References Cited

U.S. PATENT DOCUMENTS

| | | | |
|---|---|---|---|
| 8,874,511 B1 * | 10/2014 | Mathias | G06F 17/30575 707/620 |
| 2003/0130984 A1 * | 7/2003 | Quinlan | G06F 9/52 |
| 2005/0080872 A1 * | 4/2005 | Davis | G06F 11/3447 709/217 |
| 2009/0171930 A1 * | 7/2009 | Vaughan | G06F 17/30876 |
| 2012/0089699 A1 * | 4/2012 | Cholas | H04L 12/2812 709/217 |
| 2015/0201040 A1 * | 7/2015 | Horling | H04L 67/1095 709/203 |

* cited by examiner

*Primary Examiner* — Muluemebet Gurmu
(74) *Attorney, Agent, or Firm* — Fenwick & West LLP

(57) ABSTRACT

Deletion of synchronized web browsing history is enabled. A deletion filter record that specifies synchronized web browsing history to be deleted is received from a first client. The deletion filter record is stored in association with an identifier of the first client. A check-in message is received from a second client. Responsive to the check-in message, a determination is made that the stored deletion filter record is relevant to the second client. The stored deletion filter record is sent to the second client. Separately, a client's communications to a server are limited. A request is received to communicate with the server. A throttling policy is accessed. The throttling policy includes multiple ordered policy sections. A policy section indicates that all messages sent from the client to the server, up to the number of messages, must be separated by at least the time period.

15 Claims, 6 Drawing Sheets

SYNCHRONIZED WEB BROWSING HISTORIES: PROCESSING DELETIONS AND LIMITING COMMUNICATIONS TO SERVER

CROSS-REFERENCE TO RELATED APPLICATION

This application claims the benefit of U.S. Provisional Application No. 62/006,235, filed Jun. 1, 2014, which is incorporated by reference herein in its entirety.

BACKGROUND

1. Technical Field

The subject matter described herein generally relates to the field of using a server to synchronize web browsing histories generated by multiple client web browsers and, in particular, to processing deletions of web browsing history and limiting client communications to the server.

2. Background Information

When a web browser accesses a webpage, information about the access (e.g., a timestamp and a uniform resource locator (URL)) is typically logged in a web browsing history. This history can be viewed by a user (e.g., in order to access a previously-visited webpage) or automatically analyzed by the browser. Automatic analysis of web browsing history enables, for example, determining which webpages were visited the most (and making them easier to access in the future), providing automatic completion suggestions for a URL that is partially entered into an address bar's text field, and coloring a hyperlink differently if the target webpage was visited recently.

Often, a single person uses multiple web browsers on different client devices (e.g., one browser on a work computer, one browser on a personal computer, and one browser on a smart phone), as well as multiple browsers on a single client device. Each browser logs webpage accesses in its own web browsing history.

SUMMARY

The above and other issues are addressed by a method, non-transitory computer-readable storage medium, and system for enabling deletion of synchronized web browsing history. An embodiment of the method comprises receiving, from a first client, a deletion filter record that specifies synchronized web browsing history to be deleted. The method further comprises storing the deletion filter record in association with an identifier of the first client. The method further comprises receiving, from a second client, a check-in message. The method further comprises, responsive to the check-in message, determining that the stored deletion filter record is relevant to the second client. The method further comprises sending the stored deletion filter record to the second client.

An embodiment of the medium stores computer program modules executable to perform steps. The steps comprise receiving, from a first client, a deletion filter record that specifies synchronized web browsing history to be deleted. The steps further comprise storing the deletion filter record in association with an identifier of the first client. The steps further comprise receiving, from a second client, a check-in message. The steps further comprise, responsive to the check-in message, determining that the stored deletion filter record is relevant to the second client. The steps further comprise sending the stored deletion filter record to the second client.

An embodiment of the system comprises a non-transitory computer-readable storage medium storing computer program modules executable to perform steps. The steps comprise receiving, from a first client, a deletion filter record that specifies synchronized web browsing history to be deleted. The steps further comprise storing the deletion filter record in association with an identifier of the first client. The steps further comprise receiving, from a second client, a check-in message. The steps further comprise, responsive to the check-in message, determining that the stored deletion filter record is relevant to the second client. The steps further comprise sending the stored deletion filter record to the second client.

The above and other issues are addressed by a method, non-transitory computer-readable storage medium, and system for limiting a client's communications to a server. An embodiment of the method comprises receiving a request to communicate with the server. The method further comprises accessing a throttling policy that includes multiple ordered policy sections. A policy section comprises a <number of messages, period of time> pair that includes a number of messages and a time period and indicates that all messages sent from the client to the server, up to the number of messages, must be separated by at least the time period. The method further comprises determining which policy section of the multiple ordered policy sections applies to the communication request. The method further comprises determining whether the communication request complies with the applicable policy section. The method further comprises, responsive to the communication request complying with the applicable policy section, granting the communication request. The method further comprises, responsive to the communication request not complying with the applicable policy section, denying or deferring the communication request.

An embodiment of the medium stores computer program modules executable to perform steps. The steps comprise receiving a request to communicate with the server. The steps further comprise accessing a throttling policy that includes multiple ordered policy sections. A policy section comprises a <number of messages, period of time> pair that includes a number of messages and a time period and indicates that all messages sent from the client to the server, up to the number of messages, must be separated by at least the time period. The steps further comprise determining which policy section of the multiple ordered policy sections applies to the communication request. The steps further comprise determining whether the communication request complies with the applicable policy section. The steps further comprise, responsive to the communication request complying with the applicable policy section, granting the communication request. The steps further comprise, responsive to the communication request not complying with the applicable policy section, denying or deferring the communication request.

An embodiment of the system comprises a non-transitory computer-readable storage medium storing computer program modules executable to perform steps. The steps comprise receiving a request to communicate with the server. The steps further comprise accessing a throttling policy that includes multiple ordered policy sections. A policy section comprises a <number of messages, period of time> pair that includes a number of messages and a time period and indicates that all messages sent from the client to the server, up to the number of messages, must be separated by at least the time period. The steps further comprise determining which policy section of the multiple ordered policy sections applies to the communication request. The steps further comprise determining whether the communication request complies with the applicable policy section. The steps further comprise, responsive to the communication request complying with the applicable policy section, granting the communication request. The steps further comprise, responsive to the communication request not complying with the applicable policy section, denying or deferring the communication request.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
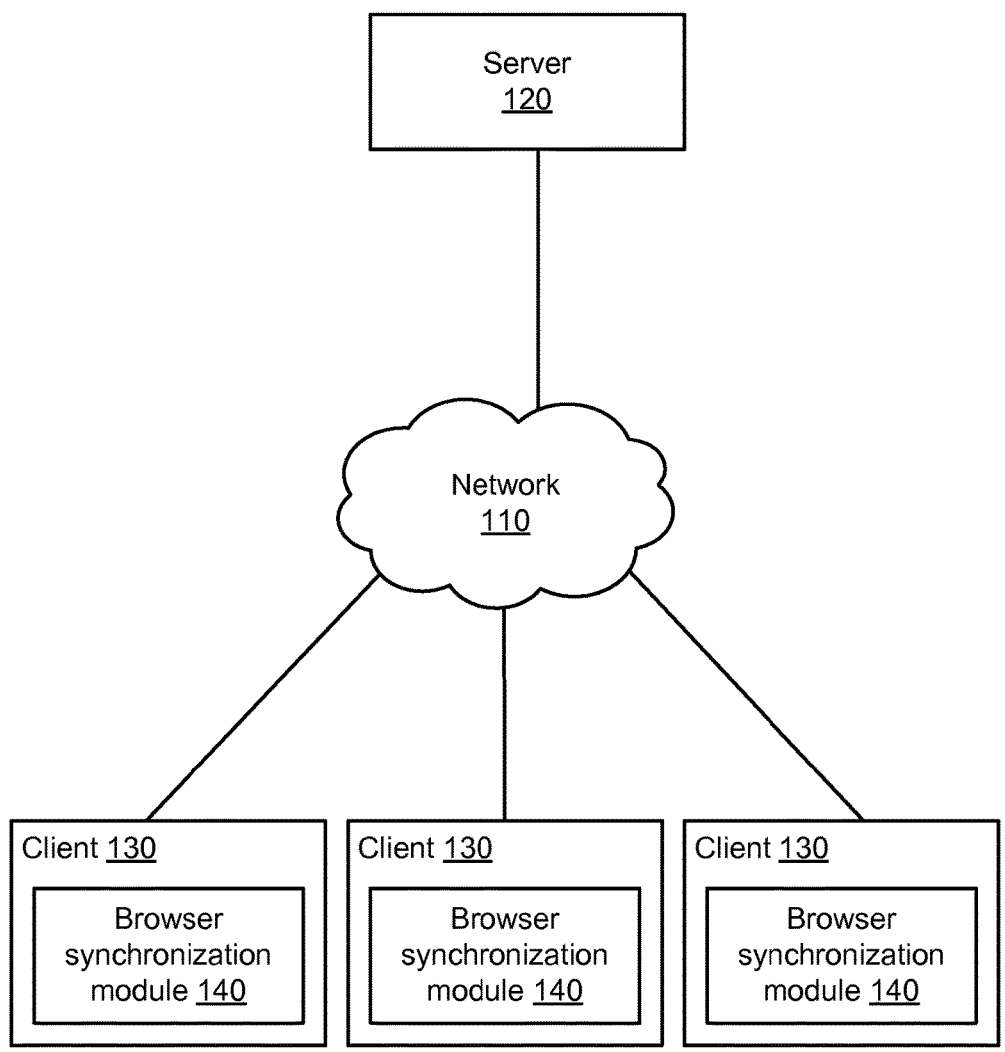
FIG. 1 is a high-level block diagram illustrating an environment for synchronizing web browsing histories in a client/server system, according to one embodiment.

FIG. 1 is a high-level block diagram illustrating an environment for synchronizing web browsing histories in a client/server system, according to one embodiment. The environment may be maintained by an enterprise (e.g., an online host service) that provides a synchronization service that enables web browsing histories generated by multiple web browsers to be synchronized. For example, the web browsing histories generated by web browsers on one or more clients 130 that are part of a synchronization group are synchronized. As shown, the environment includes a network 110, a server 120, and multiple clients 130. While one server 120 and three clients 130 are shown in the embodiment depicted in FIG. 1 for clarity, other embodiments can have different numbers of servers 120 and/or clients 130.

In one embodiment, a synchronization group ("sync group") is created as follows: A first client 130 creates a synchronization account ("sync account") with the enterprise's synchronization service ("sync service"). The first client 130 creates the sync account by, for example, authenticating with the sync service using a first identifier (ID). For example, a user manually authenticates with the sync service using the first client 130. The first client 130 activates itself to use the sync service. The first client 130 sends data (associated with the first ID) to the sync service. If a second client 130 authenticates with the sync service using the first ID and sends data (associated with the first ID) to the sync service, then the second client is added to the first client's sync account, and a sync group is created that includes the first client and the second client. A client 130 can be a member of at most one sync group. In other words, the membership of two sync groups cannot overlap—sync groups are disjoint. After a client 130 has been activated to use the sync service, the sync service begins to send information to the client.

In one embodiment, a sync account can also be used with a device that is not part of the sync account. For example, a user can use a friend's computer or a public computer and still have access to his or her sync account. This is accomplished by, for example, the user authenticating with the sync service on that device. Then, the web browser on that device can use the sync service.

The network 110 represents the communication pathway between the server 120 and the clients 130. In one embodiment, the network 110 uses standard wireless and wired communications technologies and protocols and can include the Internet and associated protocols. In another embodiment, the entities on the network 110 can use custom and/or dedicated data communications technologies.

A client 130 is a computer (or set of computers) that enables a user to visit (e.g., access and view) various webpages using a web browser. The client 130 can be, for example, a desktop computer, a laptop computer, a tablet computer, or a smart phone. As the web browser accesses the various webpages, information about each access (e.g., a timestamp and a uniform resource locator (URL)) can be logged in a browsing history 340. The client 130 sends the server 120 information regarding its browsing history 340. This information is sent periodically and/or in response to various trigger events (e.g., when a webpage is requested, accessed, or closed). The client 130 also sends the server 120 check-in messages. Sending a check-in message to the server 120 enables the client 130 to obtain browsing history information that is stored at the server (which can then be merged with the client's local browsing history 340). In one embodiment, a check-in message includes an identifier of the sending client 130 and a timestamp that indicates when the client last sent a check-in message to the server. The client 130 receives from the server 120 information regarding browsing histories 340 generated by other clients 130 that are in the same sync group as the first client 130. The client 130 uses the received browsing history information to synchronize its local browsing history 340 with the browsing histories of the other clients 130 in the sync group.

A client 130 includes a browser synchronization module 140. The browser synchronization module 140 enables the client 130 to delete web browsing history (both stored locally and, if synchronized, stored remotely). In particular, the browser synchronization module 140 on a first client 130 deletes the browsing history 340 on that client and causes web browsing histories to be deleted from other clients 130 that are in the same sync group as the first client 130. There are many reasons why a user might want to delete browsing history, most of which concern privacy and/or secrecy. Presumably, if a user wants to delete the browsing history 340 from a first client 130 and that browsing history has been synchronized with other clients, then the user wants to delete those other browsing histories, also.

The browser synchronization module 140 also enables the client 130 to limit its communications to the server 120. If there are many (e.g., thousands of) clients 130 communicating with the server 120, and each client communicates with the server 120 often, then the server can become overloaded. The browser synchronization module 140 determines whether a communication request complies with a throttling policy 360. In one embodiment, the throttling policy 360 can be updated (e.g., if the server 120 is overloaded) by a server (either server 120 or an entirely separate server that is not shown in FIG. 1). In this embodiment, the throttling policy 360 can be adjusted remotely without having to push a software update to the client 130. If the client 130 receives a new throttling policy 360, then the client applies the new policy to the client's existing data regarding the synchronizations already performed.

If the communication request complies with the throttling policy 360, then the browser synchronization module 140 grants the communication request. If the communication request does not comply with the throttling policy 360, then the browser synchronization module 140 denies or defers the communication request. For example, the communication request is deferred until it would comply with the throttling policy 360.

If the communication request is denied, the information will eventually be sent to the server 120 as part of a later communication that is not subject to throttling (e.g., a communication that is sent when the web browser is closed or re-launched). The combination of the throttling policy 360 and the triggers for attempting to synchronize (e.g., the triggers for generating communication requests) catch the browsing history information that was part of a previously denied synchronization request. When the throttling policy 360 does allow a client 130 to upload history data to the server 120, the client will upload all local history generated since the last successful synchronization (within a time window that would be allowed by an expiration date).

The browser synchronization module 140 is further described below with reference to FIGS. 3 and 5-6.

The server 120 is a computer (or set of computers) that receives browsing history information from clients 130. The amount of browsing history information received from a client 130 is proportional to the amount of browsing performed at that client. How often browsing history information is received from a client 130 depends on that client's throttling policy 360. In an example implementation, the maximum number of synchronization messages received from one client 130 might be 100 per day, and the average number of synchronization messages received from one client might be 50 per day.

The server 120 stores the received information in a synchronization journal 430. In one embodiment, information in the synchronization journal ("sync journal") 430 is stored in the form of journal entries. A journal entry includes a list of one or more operations (e.g., an addition operation to add information to a history or a deletion operation to delete information from a history) and a persistent identifier of the client 130 that sent the browsing history information (e.g., the operations). Within the sync journal 430, journal entries are organized based on the sync group that the entries are associated with. Then, within the sync group, the entries are organized based on the client 130 from which that browsing history information was received.

The server 120 also receives check-in messages from clients 130. In response to receiving a check-in message from a client 130, the server 120 sends the client relevant information from the synchronization journal 430. Specifically, the server 120 sends the client 130 information from the synchronization journal 430 that was received from other clients that are in the same sync group as the first client 130. The server 120 is further described below with reference to FIGS. 4 and 5.

Figure 2:
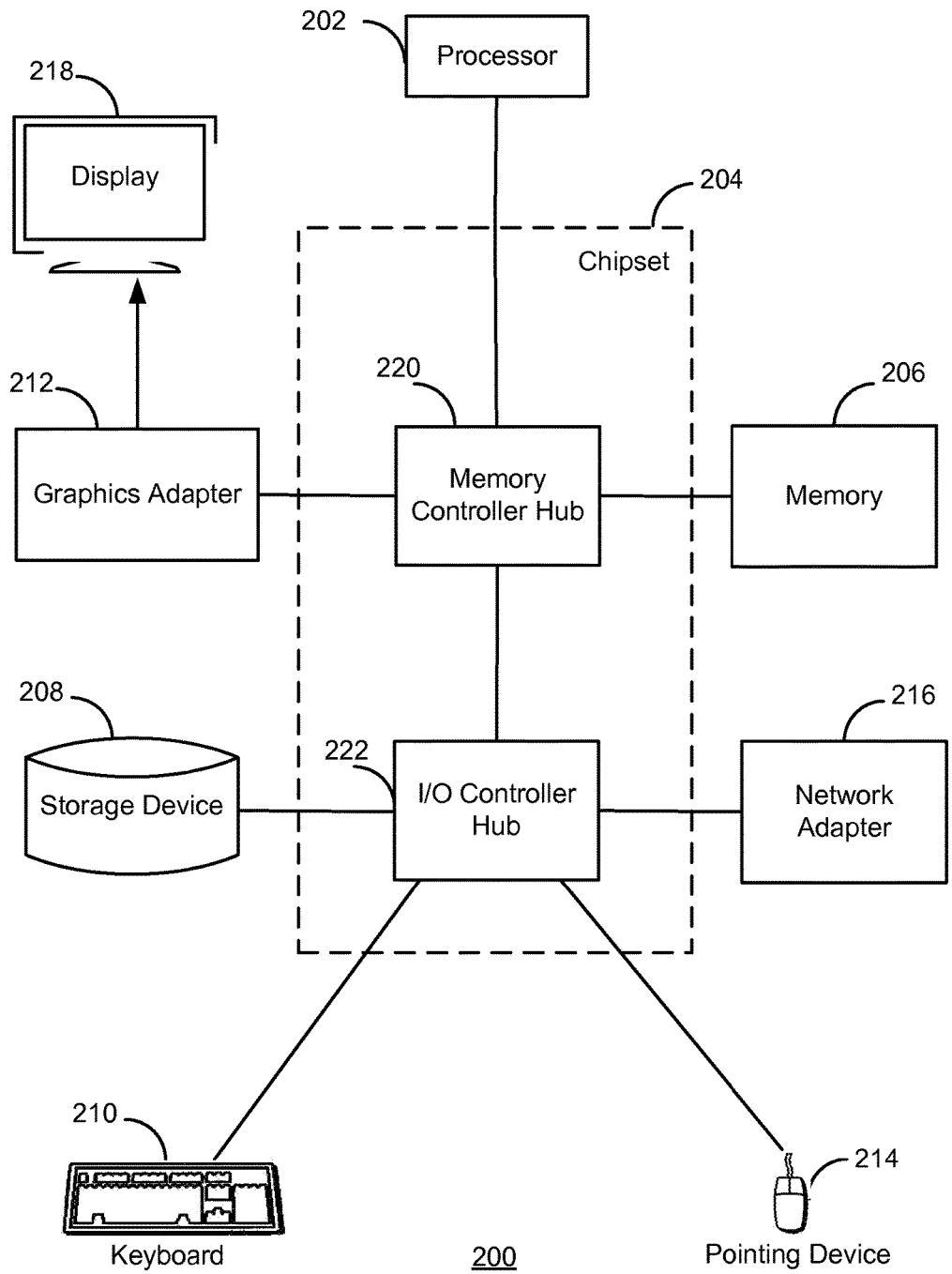
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the server 120 can be formed of multiple blade servers and lack a display device, keyboard, and other components, while the client 130 can be a desktop computer, a laptop computer, a tablet computer, or a smart phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
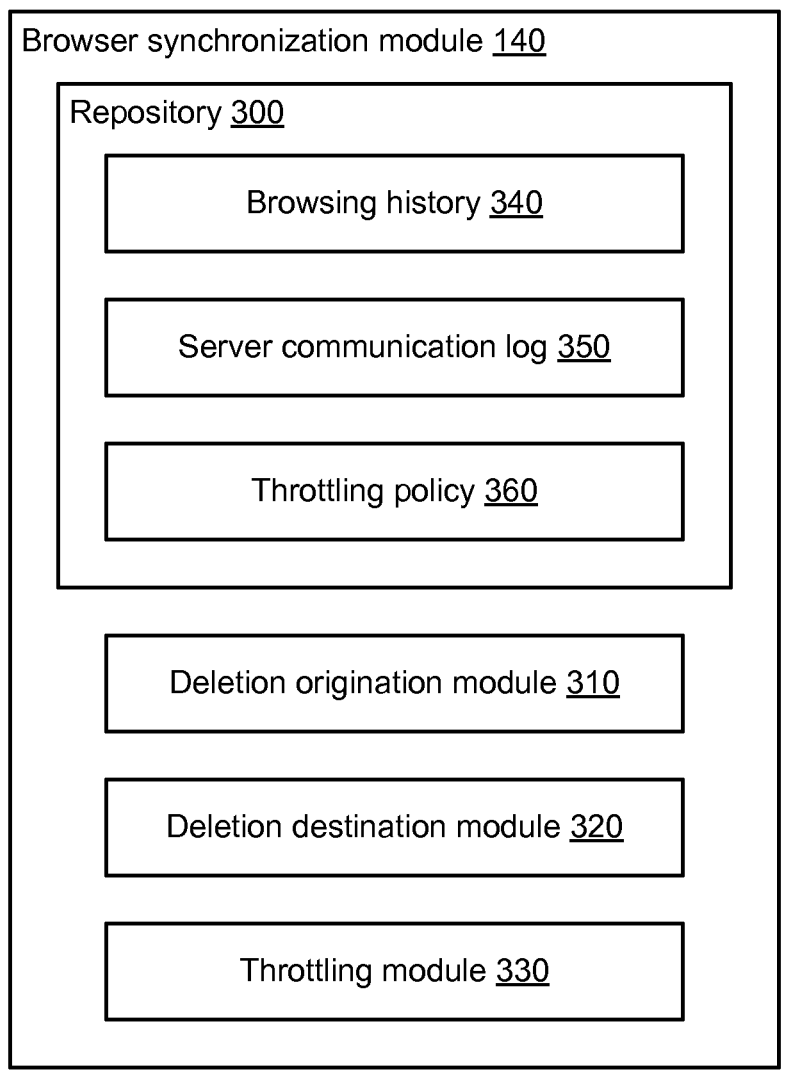
FIG. 3 is a high-level block diagram illustrating a detailed view of a browser synchronization module of a client, according to one embodiment.

FIG. 3 is a high-level block diagram illustrating a detailed view of a browser synchronization module 140 of a client 130, according to one embodiment. The browser synchronization module 140 includes a repository 300, a deletion origination module 310, a deletion destination module 320, and a throttling module 330. The repository 300 stores browsing history 340, server communication log 350, and a throttling policy 360.

The browsing history 340 stores information regarding past webpage accesses. The webpage accesses occurred either locally (i.e., on the client 130 itself) or remotely (i.e., on another client). Information regarding local webpage accesses is generated by the local web browser and stored in the browsing history 340. Information regarding remote webpage accesses is generated by a remote web browser (i.e., on another client that is in the same sync group as the first client 130), sent from that client to the server 120, received by the first client 130 from the server 120, and stored in the browsing history 340.

Information regarding remote webpage accesses includes, for example, a <timestamp, URL> pair for each webpage access, where the timestamp indicates when the access occurred, and the URL indicates which webpage was accessed. In one embodiment, remote webpage access information also includes additional information, such as the title, URL, and/or timestamp of a redirect source and/or redirect destination, whether or not the webpage load was successful, and/or whether the webpage request (e.g., HTTP request) was a GET request or a non-GET request. (Information regarding GET versus non-GET can be useful, since non-GET requests might not be appropriate to display to users in certain contexts (e.g., a list of most-visited websites).) Information regarding local webpage accesses includes the remote webpage access information and possibly additional information that was generated in conjunction with the webpage access (e.g., cookies, databases, caches, and local storage).

The server communication log 350 is used by the throttling module 330 to determine whether a communication request complies with the throttling policy 360. The server communication log 350 stores a list of chronologically-ordered timestamps, where a timestamp indicates an occurrence of the client 130 communicating with the server 120. "Communicating with the server 120" means sending a first message to the server 120 and receiving a second message from the server in response.

The throttling policy 360 is used by the throttling module 330 to determine whether to grant a communication request. The throttling policy 360 defines a limit to how frequently a client 130 can communicate with the server 120. The throttling policy 360 stores multiple ordered <number of messages, period of time> pairs (referred to as "policy sections"). A <number of messages, period of time> pair includes a number of messages and a time period and indicates that all messages sent from the client 130 to the server 120 (up to the specified number of messages) must be separated by at least the time period. For example, a policy section of $<m_1, t_1>$ indicates that the first $m_1$ messages must be separated from each other by at least $t_1$. For $i<m_1$, this means that if the $i^{th}$ message was sent at time $t_i$, then the $(i+1)^{th}$ message cannot be sent before time $t_i+t_1$.

As an example, consider a throttling policy 360 that includes a first policy section of $<m_1, t_1>$ and a second policy section of $<m_2, t_2>$. This throttling policy indicates that the first $m_1$ messages must be separated from each other by at least $t_1$ (based on the first policy section), and the next $m_2$ messages must be separated from each other by at least $t_2$ (based on the second policy section). If $m_1=50$, $t_1=1$ minute, $m_2=12$, and $t_2=10$ minutes, then the throttling policy indicates that the first 50 messages must be separated from each other by at least 1 minute (based on the first policy section, <50, 1 minute>), and the next 12 messages must be separated from each other by at least 10 minutes (based on the second policy section, <12, 10 minutes>). Note that the throttling policy 360 can include more than two policy sections.

A throttling policy 360 that stores multiple (different) policy sections enables limiting communications to the server 120 for those clients 130 that are communicating very often, while not limiting communications to the server 120 for those clients 130 that are communicating only infrequently. Also, a client 130 can be allowed to communicate with the server 120 an average number of times per day even when the length of time that that device is used throughout the day is unknown. Consider two users A and B. User A browses the web for thirty minutes per day. User B browses the web for six hours per day. If the policy were simply to synchronize every N minutes, then user B would generate 12 times as much server load as user A. Instead, if the throttling policy 360 were something like <60, 1 minute>, <12, 10 minutes>, <42, 30 minutes>, then user A would generate 30 synchronizations (each 1 minute apart). User B would generate 60 synchronizations in the first hour of use, 12 synchronizations in the next two hours of use, and 6 more synchronizations in the last 3 hours of use, for a total of 78 synchronizations. Even if a client 130 were used 24 hours per day, that client could not generate more than 114 synchronizations per day. So, the throttling policy 360 defines a maximum upper bound on server load that any one client 130 can generate.

The deletion origination module 310 and the deletion destination module 320 work together to delete web browsing history (both stored locally and, if synchronized, stored remotely). In particular, the deletion origination module 310 on a first client 130 deletes the browsing history 340 on that client and indirectly causes the deletion destination modules 320 on other clients (that are in the same sync group as the first client 130) to delete their web browsing histories.

For example, the deletion origination module 310 on the first client 130 receives a deletion request, which includes a time period and/or a set of one or more URLs. Together, the time period and/or set of URLs indicate which portions of the browsing history 340 to delete. Based on the deletion request, the deletion origination module 310 deletes the relevant portions of the local browsing history 340, generates a deletion filter record (referred to as a "tombstone"), and sends the deletion filter record to the server 120. Recall that the browsing history 340 includes <timestamp, URL> pairs that represent webpage accesses. The deletion request's time period indicates that portions of the browsing history 340 whose timestamps fall within the specified time period should be deleted. The deletion request's set of URLs indicates that portions of the browsing history 340 whose URLs match any of the URLs in the specified set of URLs should be deleted. The tombstone includes the deletion request's time period, the deletion request's set of URLs, and an identifier of the first client 130.

The deletion destination module 320 on a second client 130 receives a deletion filter record ("tombstone") from the server 120. Based on the tombstone, the deletion destination module 320 deletes the relevant portions of its local browsing history 340. The tombstone's time period indicates that portions of the browsing history 340 whose timestamps fall within the specified time period should be deleted. The tombstone's set of URLs indicates that portions of the browsing history 340 whose URLs match any of the URLs in the specified set of URLs should be deleted.

The throttling module 330 limits the frequency of the client's communications to the server 120. Specifically, the throttling module 330 analyzes the server communication log 350 to determine whether a communication request complies with the throttling policy 360. If the communication request complies with the throttling policy 360, then the throttling module 330 grants the communication request. If the communication request does not comply with the throttling policy 360, then the throttling module 330 denies or defers the communication request.

For example, the throttling module 330 receives a request to communicate with the server 120. In response to receiving the request, the throttling module 330 determines which policy section applies to the communication request. For example, the throttling module 330 compares the number of entries (e.g., timestamps) in the server communication log 350 to the message numbers in the various policy sections. In the example throttling policy 360 given above, if the server communication log 350 has 49 or fewer entries, then the requested communication would be within the first 50 messages, and the first policy section of <50, 1 minute> applies. If the server communication log 350 has 50 or more entries, then the requested communication would be after the first 50 messages, and the second policy section of <12, 10 minutes> applies.

The throttling module 330 determines how much time has elapsed since the most recent communication to the server 120. For example, the throttling module 330 subtracts the most recent timestamp in the server communication log 350 from the current time. The throttling module 330 determines whether the communication request complies with the applicable policy section. For example, the throttling module 330 compares the elapsed time with the time period in the applicable policy section. If the elapsed time meets or exceeds the time period, then the communication request complies with the applicable policy section, and the throttling module 330 grants the communication request. If the elapsed time is less than the time period, then the communication request does not comply with the applicable policy section, and the throttling module 330 denies or defers the communication request.

A client 130 sends to the server 120 multiple classes of communications, such as communications that fetch information from the server (e.g., check-in messages), communications that push history additions to the server, and communications that push history deletions to the server. Requests to send any or all of these types of communications can be throttled. In one embodiment, all types of communication requests are treated equally with respect to the server communication log 350 and the throttling policy 360. In other embodiments, multiple server communication logs 350 are used (one log per class of communication request) and/or multiple throttling policies 360 are used (one policy per class of communication request). In this way, the throttling module 330 can operate differently based on different types of communication requests. For example, deletion communication requests can have a more permissive throttling policy 360 than addition communication requests (e.g., in order to meet user expectations).

In one embodiment, the throttling module 330 also modifies the server communication log 350 as necessary. For example, in response to a successful communication with the server 120, the throttling module 330 adds a timestamp of that successful communication to the server communication log 350. As another example, in response to a timestamp within the server communication log 350 aging out, the throttling module 330 deletes that timestamp from the server communication log. A timestamp "ages out" when the total length of monitoring time has passed. In the example throttling policy 360 given above, the total length of monitoring time=50×1 minute+12×10 minutes=170 minutes.

Figure 4:
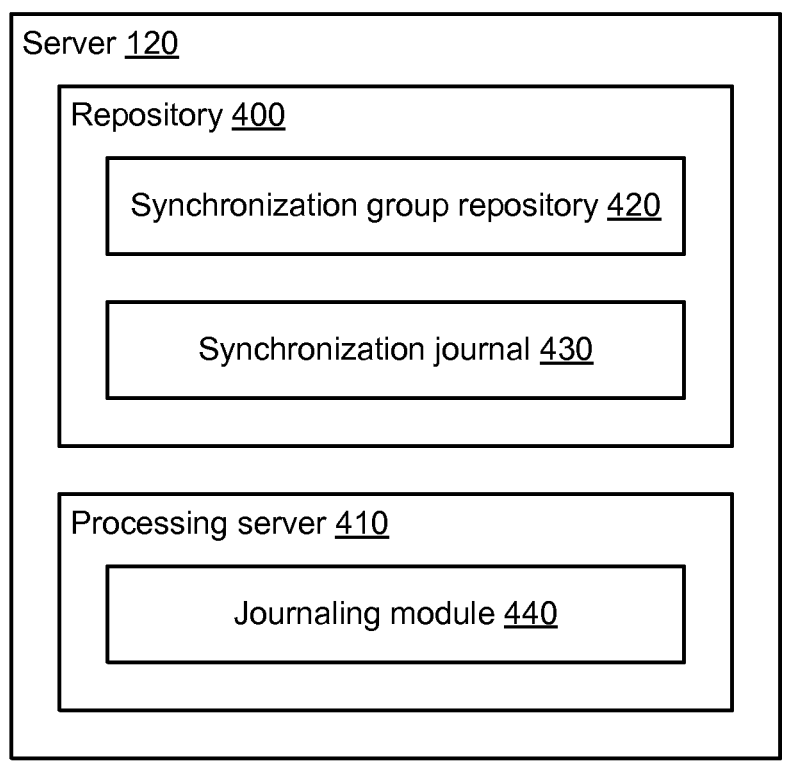
FIG. 4 is a high-level block diagram illustrating a detailed view of a server, according to one embodiment.

FIG. 4 is a high-level block diagram illustrating a detailed view of a server 120, according to one embodiment. The server 120 includes a repository 400 and a processing server 410. The repository 400 is a computer (or set of computers) that stores a synchronization group repository 420 and a synchronization journal 430. In one embodiment, the repository 400 includes a server that provides the processing server 410 access to the synchronization group repository 420 and the synchronization journal 430 in response to requests.

The synchronization group repository 420 stores information about one or more synchronization groups ("sync groups"). A sync group includes multiple clients 130. Web browsing histories generated by web browsers on clients 130 that are part of the same sync group are synchronized. The synchronization group repository 420 stores, for a particular sync group, an identifier for each client 130 in that sync group. The identifier can be, for example, a media access control (MAC) address.

The synchronization journal 430 stores web browsing history information in the form of journal entries. A journal entry is, for example, a portion of web browsing history or a deletion filter record ("tombstone"). A journal entry is associated with an identifier of the client 130 that sent that piece of information to the server 120. In one embodiment, a journal entry also includes an expiration date, which is used by the journaling module 440. The server 120 determines what the expiration date should be.

The processing server 410 includes a journaling module 440. In one embodiment, the processing server 410 includes a computer (or set of computers) that communicates with the repository 400 and processes data (e.g., by executing the journaling module 440). In one embodiment, the processing server 410 includes a web server that responds to requests from a client 130.

The journaling module 440 receives web browsing history information (e.g., web browsing histories or tombstones) from clients 130 and stores this information in the synchronization journal 430 in the form of journal entries. A journal entry is associated with the client 130 that sent that piece of information to the server 120. The journaling module 440 also receives check-in messages from clients 130. In response to receiving a check-in message from a particular client 130, the journaling module 440 determines which other clients are in that particular client's sync group. For example, the journaling module 440 obtains this information from the synchronization group repository 420. The journaling module 440 determines which entries in the synchronization journal 430 are relevant to that particular client 130. For example, the journaling module 440 determines which entries in the synchronization journal 430 are associated with other clients in that particular client's sync group. The journaling module 440 sends the relevant journal entries to the particular client 130.

In one embodiment, the journaling module 440 also modifies the synchronization journal 430 as necessary. Recall that, in one embodiment, a journal entry includes an expiration date. In response to the expiration of a journal entry that is stored in the synchronization journal 430, the journaling module 440 removes that entry from the journal.

Figure 5:
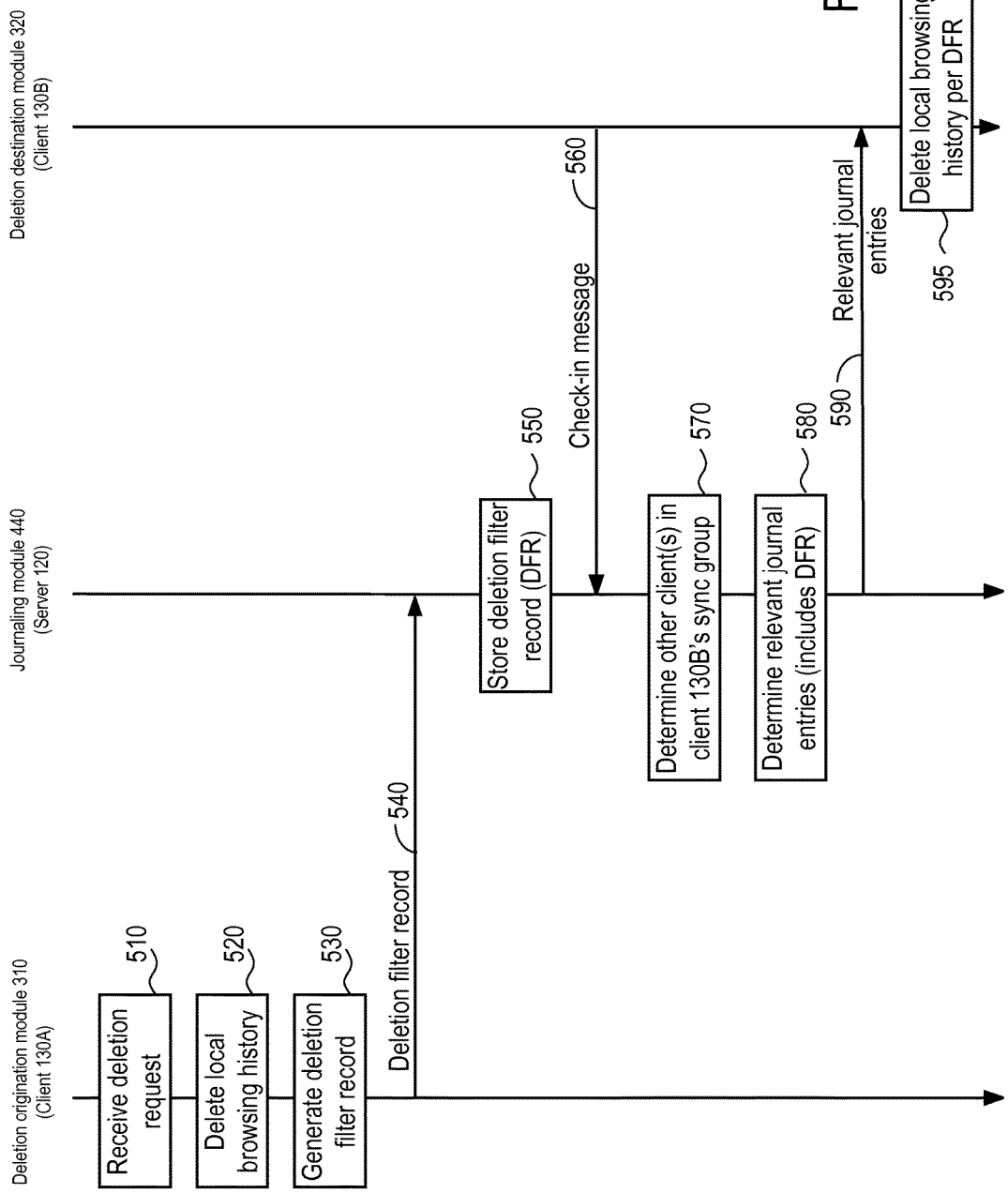
FIG. 5 is a sequence diagram illustrating steps involved in deleting synchronized web browsing histories, according to one embodiment.

FIG. 5 is a sequence diagram illustrating steps involved in deleting synchronized web browsing histories, according to one embodiment. Before the sequence starts, sync group information has already been stored in the sync group repository 420. Specifically, the sync group repository 420 stores information regarding a sync group that includes a first client 130A and a second client 130B.

In step 510, deletion origination module 310 on client 130A receives a deletion request. The deletion request was generated due to, for example, a user invoking a web browsing history deletion feature such as a "clear history" feature (which deletes all browsing history, including browsing history for all URLs from the present time to all past time), a "rewind" feature (which deletes browsing history for all URLs from the present time back to a particular point in time, such as 1 day ago, 1 week ago, or 1 month ago), or a "delete individual item" feature (which deletes browsing history for a particular URL from the present time back to a particular point in time).

In step 520, the deletion origination module 310 on client 130A deletes local browsing history 340 in accordance with the deletion request. In step 530, the deletion origination module 310 on client 130A generates a deletion filter record (tombstone) in accordance with the deletion request. Note that steps 520 and 530 can occur in either order.

In step 540, the deletion origination module 310 on client 130A sends the tombstone to the server 120.

In step 550, the journaling module 440 on the server 120 stores the tombstone received from client 130A in the synchronization journal 430 in the form of a journal entry associated with client 130A.

In step 560, the client 130B sends a check-in message to the server 120.

In step 570, in response to receiving the check-in message, the journaling module 440 on the server 120 determines which other clients are in client 130B's sync group. For example, the journaling module 440 queries the synchronization group repository 420 to obtain this information. In this example, client 130A is in client 130B's sync group.

In step 580, the journaling module 440 on the server 120 determines which entries in the synchronization journal 430 are relevant to client 130B. In this example, the deletion filter record that was stored in step 550 is relevant to client 130B.

In step 590, the journaling module 440 on the server 120 sends the relevant journal entries to client 130B.

In step 595, the deletion destination module 320 on client 130B deletes its local browsing history 340 in accordance with the received deletion filter record.

Figure 6:
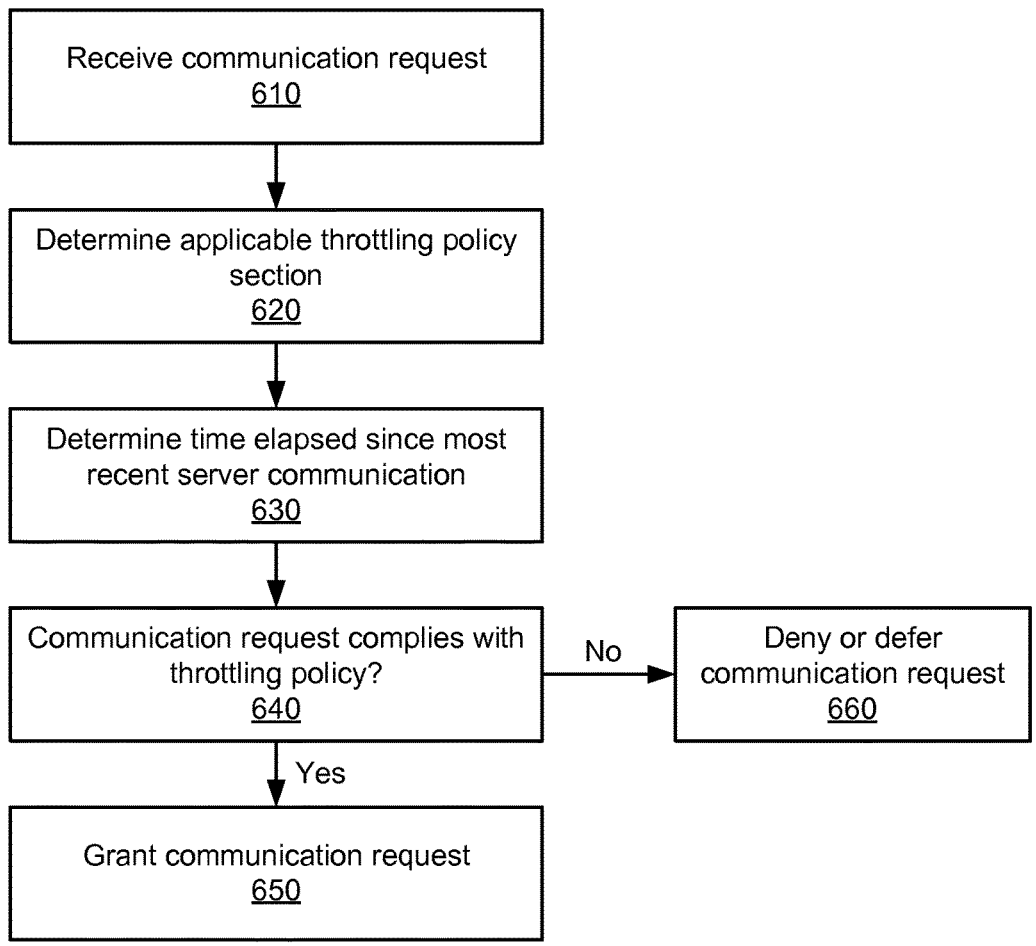
FIG. 6 is a flowchart illustrating a method of limiting a client's communications to the server, according to one embodiment.

FIG. 6 is a flowchart illustrating a method 600 of limiting a client's communications to the server 120, according to one embodiment. Before the method 600 starts, timestamps have already been stored in the server communication log 350, and a throttling policy has already been stored in the throttling policy 360. In one embodiment, the method 600 is performed by a throttling module 330 of a client 130. Other embodiments can perform the steps in different orders and can include different and/or additional steps. In addition, some or all of the steps can be performed by entities other than those shown in FIG. 1.

In step 610, a request to communicate with the server 120 is received.

In step 620, the section of the throttling policy 360 that applies to the communication request is determined. For example, the throttling module 330 compares the number of entries (e.g., timestamps) in the server communication log 350 to the message numbers in the various policy sections.

In step 630, the time that has elapsed since the most recent server communication is determined.

In step 640, a determination is made regarding whether the communication request complies with the throttling policy 360. If the communication request does comply with the throttling policy 360, then the method proceeds to step 650, and the communication request is granted. If the communication request does not comply with the throttling policy 360, then the method proceeds to step 660, and the communication request is denied or deferred.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of enabling deletion of synchronized web browsing history, comprising:

receiving by a server, from a first client through a network, a deletion filter record that includes (i) a time period corresponding to a first portion of synchronized web browsing history to be deleted and (ii) a second portion of the synchronized web browsing history as defined by a user for deletion, the synchronized web browsing history including timestamps indicating when webpage accesses occurred and including information indicating whether a webpage load was successful;

storing, by the server, the deletion filter record in association with an identifier of the first client;

receiving, from a second client through the network, a check-in message, the second client device different than the first client device;

responsive to the check-in message, determining that the stored deletion filter record is relevant to the second client; and causing the second client to delete (i) a portion of a web browsing history in the second client corresponding to the first portion and (ii) a portion of the web browsing history in the second client corresponding to the second portion, wherein the deletion is caused by sending the stored deletion filter record.

2. The method of claim 1, wherein the synchronized web browsing history to be deleted includes a <timestamp, URL (uniform resource locator)> pair that describes an access of a webpage, wherein the URL indicates which webpage was accessed.

3. The method of claim 1, wherein the deletion filter record includes a set of one or more URLs that specifies deletion of browsing history portions whose URLs match any of the URLs in the set.

4. The method of claim 1, wherein the deletion filter record indicates that all browsing history should be deleted, including browsing history for all URLs from a present time to all past time.

5. The method of claim 1, wherein determining that the stored deletion filter record is relevant to the second client comprises:

determining that the first client and the second client are members of a same synchronization group; and determining that the stored deletion filter record is associated with the first client.

6. A non-transitory computer-readable storage medium storing computer program modules for enabling deletion of synchronized web browsing history, the computer program modules executable to perform steps comprising:

receiving by a server, from a first client through a network, a deletion filter record that includes (i) a time period corresponding to a first portion of synchronized web browsing history to be deleted and (ii) a second portion of the synchronized web browsing history as defined by a user for deletion, the synchronized web browsing history including timestamps indicating when webpage accesses occurred and including information indicating whether a webpage load was successful;

storing, by the server, the deletion filter record in association with an identifier of the first client;

receiving, from a second client through the network, a check-in message, the second client device different than the first client device;

responsive to the check-in message, determining that the stored deletion filter record is relevant to the second client; and causing the second client to delete (i) a portion of a web browsing history in the second client corresponding to the first portion and (ii) a portion of the web browsing history in the second client corresponding to the second portion, wherein the deletion is caused by sending the stored deletion filter record.

7. The non-transitory computer-readable storage medium of claim 6, wherein the synchronized web browsing history to be deleted includes a <timestamp, URL (uniform resource locator)> pair that describes an access of a webpage, wherein the URL indicates which webpage was accessed.

8. The non-transitory computer-readable storage medium of claim 6, wherein the deletion filter record includes a set of one or more URLs that specifies deletion of browsing history portions whose URLs match any of the URLs in the set.

9. The non-transitory computer-readable storage medium of claim 6, wherein the deletion filter record indicates that all browsing history should be deleted, including browsing history for all URLs from a present time to all past time.

10. The non-transitory computer-readable storage medium of claim 6, wherein determining that the stored deletion filter record is relevant to the second client comprises:
    determining that the first client and the second client are members of a same synchronization group; and
    determining that the stored deletion filter record is associated with the first client.

11. The non-transitory computer-readable storage medium of claim 6, wherein the synchronized web browsing history to be deleted includes webpage cookies generated with the webpage accesses.

12. The method of claim 1, wherein the synchronized web browsing history to be deleted includes webpage cookies generated with the webpage accesses.

13. The method of claim 5, wherein the synchronization group is generated responsive to receiving authentication for synchronization service from the first client and the second client.

14. The method of claim 13, wherein a set of one or more computers different than the first client and the second client includes a repository storing the synchronization group.

15. The non-transitory computer-readable storage medium of claim 10, wherein the synchronization group is generated responsive to receiving authentication for synchronization service from the first client and the second client.

* * * * *